J. FOSTER.
ATTACHING HUBS TO AXLES.
No. 7,117.  Patented Feb. 26, 1850.
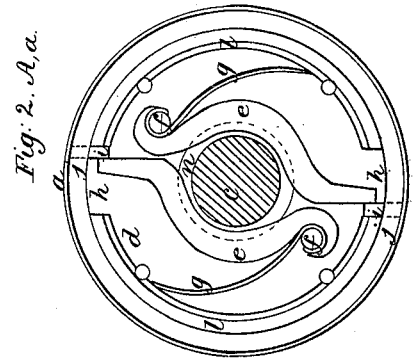
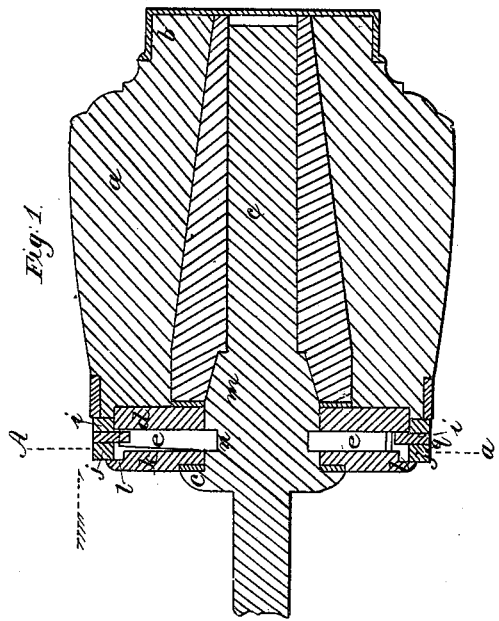

UNITED STATES PATENT OFFICE.

JUNIUS FOSTER, OF BRIDGEPORT, CONNECTICUT.

CONNECTING HUBS WITH AXLES.

Specification of Letters Patent No. 7,117, dated February 26, 1850.

*To all whom it may concern:*

Be it known that I, JUNIUS FOSTER, of Bridgeport, in the county of Fairfield and State of Connecticut, have invented a certain new and useful Improvement in the Method of Securing the Hubs of Carriage-Wheels on Their Axles, and that the following is a full, clear, and exact description of the principle or character which distinguishes my invention from all other things before known and of the manner of making, constructing, and using the same, reference being had to the accompanying drawings, making part of this specification, in which—

Figure 1 is a longitudinal section of the hub and axle, and Fig. 2 a cross section taken at the line (A, a) of Fig. 1, and looking in the direction of the arrow.

The same letters indicate like parts in both the figures.

A method of securing hubs on axles, to be practically successful, must present the following qualities, viz: It must admit of being taken off and put on with ease for the purpose of cleaning and oiling. It must exclude dirt and confine the oil within the hub, to prevent wear, friction and waste. It must not be liable to derangement, and finally, it must be so constructed and arranged as not to be disconnected from the axle by accident, and this latter is the most important quality as most of the serious accidents which occur in wheeled carriages arise from the wheel coming off when the carriage is in motion.

My present improvement possesses all these important qualities: The outer end of the hub is closed and the inner end has a metal box attached to it with a recess in which are fitted two spring collars which fit in a groove in the axle to hold the hub onto the axle, and these collars with their springs are entirely inclosed in the box by a cap-plate, the axle being provided with a shoulder packed with leather, which bears against the outside face of the cap-plate to prevent the escape of oil and the access of dirt. In putting on the hub the spring collars are forced outward by the conical form of one of the shoulders of the groove, and they are forced into the groove by the tension of the springs so soon as the hub reaches its place on the axle. And for the purpose of removing the hub from the axle the spring collars are drawn out of the groove in the axle by a metal ring which is fitted to and turned on the periphery of the box one end of each of the spring clamps being made to project out through a slot in the periphery of the box to be acted upon by a projection from the inner periphery of the metal ring. The outer periphery of said ring being cylindrical and provided with a hole or holes to receive the point or points of a wrench by which it is turned to force the spring collars outward when it is required to take off the hub.

In the accompanying drawings (a) represents the hub which may be of any desired form or construction, with the outer end (b) closed, and (c) the arm of the axle fitted to the pipe box of the hub. To the inner end of the hub is attached a metal box (d), the inside of which is made of sufficient capacity to receive two clamps (e, e) which turn on fulcrum pins (f, f,). They are provided with springs (g, g,) the tension of which keeps them closed and their outer ends extend into slots (h, h,) in the periphery of the box, so that they can be acted upon to open them, by pins (i, i,) projecting from the inner periphery of a metal ring (j) which is fitted to and turns on the box. The whole is then inclosed by a cap-plate (k) secured to the box by screws or bolts. The ring should not project beyond the periphery of the box and for that purpose there is a shoulder (l) on one side of the box and the cap-plate on the other which are flush with or project a little beyond the periphery of the ring.

The arm of the axle is enlarged at (m) with a groove (n) to receive the spring collars and this enlargement forms the shoulders of the groove and the outside one is made conical so that when the hub is forced onto the axle the conical form of this shoulder forces out the collars until the hub reaches its place when the collars spring into the groove and hold the hub onto the axle.

The axle outside the hub is formed with a shoulder (o) packed with leather which fits in a recess in the outer face of the cap-plate to prevent the access of dirt to the inside of the hub and to prevent the escape of oil.

The outer periphery of the ring has a hole (q) or two such holes to receive the pins of a wrench for the purpose of turning the ring to draw the spring collars out of the groove of the axle when it is desired to take off the hub.

From the above it will be seen that the hub can be taken off and be put on with ease that dirt is entirely excluded and oil prevented from escaping, that it is not liable to derangement as the spring collars are entirely inclosed, and that the hub cannot come off by accident, for there is no possible means during the running of the carriage to act on the collars to draw them out of the groove, for there is not any projection outside the hub the striking of which by any accident would act on the collars to draw them out of the groove.

What I claim as my invention and desire to secure by Letters Patent is—

Inclosing the spring collars that fit and run in the groove of the axle, within a box at the inner end of the hub, substantially as herein described when this is combined with the ring fitting to and turning on the outer periphery of the box and acting on the ends of the spring collars for the purpose of drawing them out of the groove when it is desired to take off the hub substantially as described.

JUNIUS FOSTER.

Witnesses:
A. E. SMITH,
ISAAC SHERMAN.